United States Patent [19]

Thomas

[11] Patent Number: 4,893,713

[45] Date of Patent: Jan. 16, 1990

[54] PROTECTOR PALLET FOR AIRCRAFT WHEEL ASSEMBLIES

[76] Inventor: William A. Thomas, 2444 Santa Ynez Way, Palm Springs, Calif. 92264

[21] Appl. No.: 318,607

[22] Filed: Mar. 3, 1989

[51] Int. Cl.$^4$ .............................................. B65D 85/06
[52] U.S. Cl. .................................. 206/304; 301/37 P; 301/37 S; 206/493
[58] Field of Search ................. 206/304, 303, 493, 54, 206/53, 403; 244/103 R; 301/37 SA, 37 P, 37 S, 37 SC; 224/42.2; 292/59, 58

[56] References Cited

U.S. PATENT DOCUMENTS

| | | | |
|---|---|---|---|
| 2,189,407 | 2/1940 | Rueppel | 206/304 |
| 3,913,735 | 10/1975 | Durbin | 206/303 |
| 4,304,279 | 12/1981 | Thomas | 206/304 |
| 4,550,827 | 11/1985 | Watts et al. | 206/303 |

Primary Examiner—Paul T. Sewell
Assistant Examiner—Jacob K. Ackun, Jr.
Attorney, Agent, or Firm—Poms, Smith, Lande & Rose

[57] ABSTRACT

A protector for aircraft wheel assemblies comprises an annular upper main protective member and an annular lower main protective member, each extending in a radial direction over a respective tire sidewall for enclosing and sealing the hub, and for at least partially covering the tire sidewalls. Each main protective member includes one of a pair of mating portions so that wheel assemblies fitted with the protector may be stacked and transported horizontally. The main protective members are clamped to the wheel assembly using adjustable clamping means, including an externally threaded shaft member and a tubular shaft member for receiving the threaded shaft member. The threaded shaft member is further provided with a locking T-member which seats securely in a groove in a reinforcing member on the lower main protective member.

16 Claims, 3 Drawing Sheets

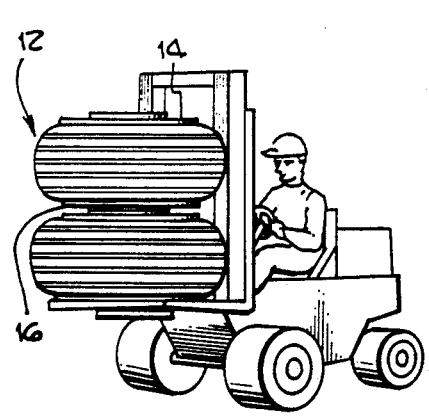
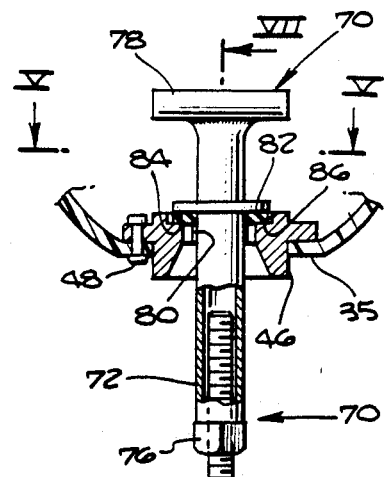
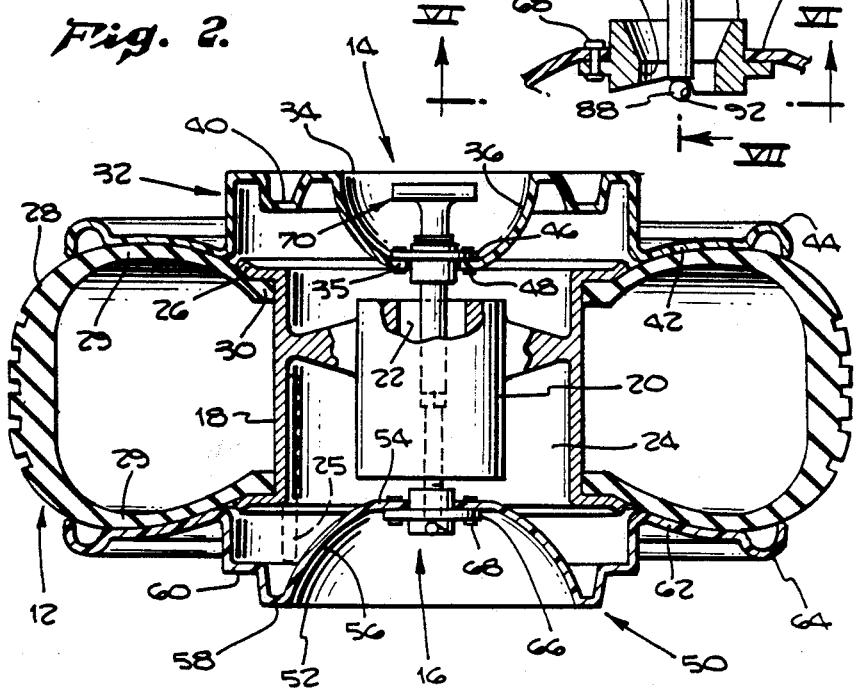
Fig. 1.
Fig. 2.
Fig. 3.

PROTECTOR PALLET FOR AIRCRAFT WHEEL ASSEMBLIES

FIELD OF THE INVENTION

The invention relates to a protector for wheel assemblies and in particular for aircraft wheel assemblies.

BACKGROUND OF THE INVENTION

The cost in terms of both time and money of repairing aircraft wheel assemblies which have been damaged in storage or in transport adds significantly to total maintenance costs. Rough handling, for example, often leads to denting, gouging and other damage to the wheel or tire structure. This occurs with expensive frequency when the wheels are handled for shipment between airports. In order to detect and repair the possible damage, expensive and time-consuming operations such as X-ray inspection and repolishing must be employed. In some cases, damage to the sidewalls of the tire by a fork lift truck, for example, has required replacement of the tire.

The likelihood of loss or damage is further increased when the wheels are to be stored or shipped with bearings in place around the central hub of the wheel. In these cases, mishandling of the wheel assembly may lead to the bearings falling out or being damaged in transit. Mishandling is, however, not the only cause of otherwise unnecessary maintenance of aircraft wheel assemblies.

If wheel assemblies are shipped with insufficient covering, there is also the problem that dust, rain, condensation, etc., will have to be cleaned from the wheel or bearings before the assembly is fit for use. There has therefore been a long-standing need for some form of protective covering for aircraft wheel assemblies which not only lessens the risk of mechanical damage and loss, but also provides protection against the weather and against soiling.

Common ways of providing this covering illustrate the extent of the need, and the insufficiency of most prior solutions. Many airlines, for example, simply tape over the hub area of the wheel; some screw a special metal plate onto the hub in an attempt to hold in the wheel bearings; still others tape or strap often ill-fitting sheets of wood over the metal of the wheel. None of these prior solutions, however, provides the degree of protection and ease of installation which are desired in the airline industry.

A protector for aircraft wheel assemblies which has met the need to a much greater extent, and which consequently has enjoyed far greater success in the industry, is described in U.S. Pat. No. 4,304,279. According to this solution, an annular, mainly concave plastic cover is provided for each side of the wheel. The covers are positioned so that they cover the metal of the wheel, whereby an inwardly projecting annular protrusion on each cover seats about the tire bead on either side of the wheel in order to provide at least a partial weather seal. An inner annular recess on the outer cover is provided to receive the outer portion of a heat shield, which is often included in aircraft wheel assemblies. The covers are mounted on the wheel assembly, and are secured to each other, using a locking T-bar which is inserted through a central hole in the inner cover, through the central bore of the wheel, and lastly through a central hole in the outer cover. The T-bar is then rotated so that a T-member on the T-bar comes to rest in a radial groove in the outer member. Finally, a wing nut is used to tighten the covers.

This solution represents a marked improvement over the other prior art protectors, and is now used by a large number of the major air carriers of the world. It does, however, suffer from several weaknesses. In order to insure that the outermost portion of the T-bar does not extend beyond the outer limiting plane of either cover, T-bars of different lengths are needed for wheels of different thicknesses. It furthermore exhibits disadvantages, explained below, which are common to all arrangements according to the prior art.

A serious shortcoming of prior art arrangements is that they require wheel assemblies to be stored and moved mainly vertically. It is not possible to stack wheel assemblies horizontally, either in a storage area, or in the hold of an aircraft, since no part of the protectors adequately supports and protects protruding members of the wheel assembly. When positioned horizontally, there is furthermore a risk that bearings may become dislodged or even fall out. Because of these risks of potential damage, wheel assemblies according to prior art arrangements must be stored and moved mainly vertically, often in vertical, rollable stands or racks. Occasionally, the wheel assemblies are simply leaned either against each other or against some vertical supporting surface. There are at least two major drawbacks to this solution.

First is the danger of personal injury to the workmen who must handle the wheel assemblies. It is to be noted that most aircraft wheel assemblies weigh several hundred pounds each. In addition to the risk of injury, moving such a heavy wheel by hand often requires the efforts of more than one man. Ideally it should be possible to move at least one, and preferably more than one, wheel assembly using a forklift. This is, however, not possible using prior wheel protectors, since the wheels would have to be carried and stacked horizontally.

Second is the inefficient use of storage space associated with vertical storage. Short of installing special, heavy-duty shelves and loading ramps in the storage area, potential storage space higher than the diameter of a tire cannot be used. Vertical storage of course leads to a corresponding inefficient use of the cargo hold of an aircraft when transporting the wheel assemblies. It has been estimated that horizontal storage of typical aircraft wheel assemblies by stacking them three or four high reduces required storage space 40–50%.

U.S. Pat. No. 4,790,430 discloses a horizontally stackable shipping container including covers which are clamped on either side of an aircraft brake assembly. The containers are made stackable by providing the base and top covers with mating projections and recesses. The pattern and shape of the projections and recesses is, however, irregular, so that manufacture is unnecessarily complicated. The container disclosed is, moreover, limited to brake assemblies, and requires the brake assemblies to be removed and placed in a cylindrical body tube. The container is therefore not suitable or intended to allow quick mounting on entire aircraft wheel assemblies, and it cannot protect tires. Finally, the base and top covers are mainly flat, so that when stacked, there is little or no space between them. It is therefore not possible to remove, for example, the uppermost container using a forklift.

Accordingly, one object of the present invention is to provide an easily installed, light-weight, compact protector for wheel assemblies which seals effectively against the environment while providing improved protection against damage to not only the metal of the wheel but also to the tire. Another object is to provide adequate protection for bearings and, if mounted, protruding members such as a heat shield or brake lugs. Yet another object of the present invention is to provide a protector for wheel assemblies which permits stable horizontal stacking, storage and transportation of the assemblies.

SUMMARY OF THE INVENTION

According to one aspect of the present invention, a protector for wheel assemblies comprises an annular upper main protective member and an annular lower main protective member, each extending in a radial direction over a respective tire sidewall for enclosing and sealing the hub, and for at least partially covering the tire sidewalls.

According to a second aspect of the invention, each main protective member includes one of a pair of mating portions—one a recess and the other a corresponding protrusion—so that wheel assemblies fitted with the protector may be stacked and transported horizontally.

According to a third aspect of the invention, the main protective members are clamped to the wheel assembly using adjustable clamping means, including an externally threaded shaft member and a tubular shaft member for receiving the threaded shaft member. The threaded shaft member is further provided with a locking T-member which seats securely in a groove in a reinforcing member on the lower main protective member.

BRIEF DESCRIPTION OF THE DRAWINGS

FIG. 1 illustrates how multiple wheel assemblies provided with protectors according to the invention may be stacked and moved horizontally;

FIG. 2 shows a partial vertical cross section taken through an exemplifying wheel assembly and through the present protector;

FIG. 3 shows a partial cross section of reinforcing members in each of two main protective members included in the present protector, and of a clamping member;

DETAILED DESCRIPTION

Figure 5:
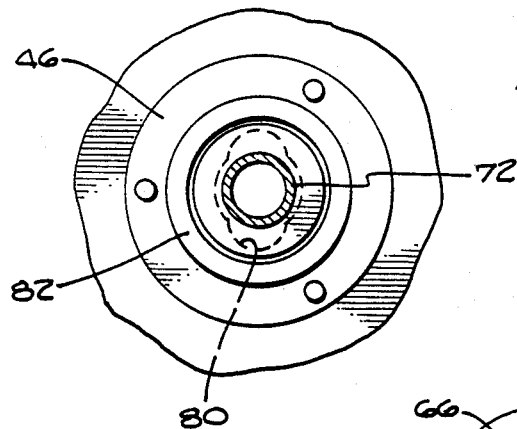
FIG. 5 is a view of an upper reinforcing member viewed generally along line V—V in FIG. 3.

Referring more particularly to the drawings, FIG. 1 illustrates two wheel assemblies being transported in a stacked, horizontal position by means of a forklift. Reference numeral 12 designates a wheel assembly generally. In this exemplifying embodiment it will be assumed that the wheel assembly is for an aircraft. Each wheel assembly is provided with an upper main protective member 14 and an lower main protective member 16 in accordance with the present invention. For the sake of simplicity, only the upper wheel assembly in FIG. 1 has been marked. How this stacking is made possible will be described in detail below. FIG. 1 also illustrates the size of a typical aircraft wheel assembly relative to a workman.

For ease of reference, the modifiers "upper" and "lower" refer to the orientation of the wheel assembly and protector as shown in FIG. 2. It is to be understood that this orientation is not essential to the invention. In practice, the upper portion will normally represent the outboard portion of the wheel, whereas the lower portion normally will represent the inboard portion. The present invention equally allows wheel assemblies to be stacked "upside down" relative to the figures. Also, when actually mounting the present protector on a wheel assembly, the assembly will normally be vertical.

FIG. 2 shows a partial cross section of a wheel assembly 12 and of the present protector in greater detail. The protector includes the upper and the lower main protective members, designated generally by reference numerals 14 and 16, respectively.

The wheel assembly itself includes a rim 18 and a hub 20. A central bore 22 extends in an axial direction through the hub for receiving an axle when the wheel is mounted on an aircraft. Adjacent to the hub on at least one side of the wheel is an annular cavity 24 in which the brakes are receivd as the wheel is mounted on the aircraft. The dashed line 25 schematically represents either one portion of the heat shield, or one of the brake lugs which are mounted around the inner surface of the wheel to engage with or to interlock with the aircraft brake disks. In FIG. 2 this cavity 24 is shown as being on the lower side of the wheel, but the present invention does not require this.

Mounted on the rim in a conventional manner is a tire 28 having sidewalls 29 and tire beads 30. As is usual for wheel assemblies, the tire bead on either side of the tire seats firmly against the corresponding receiving edge 26 of the rim, whereby internal pressure increases the sealing effect.

The protector itself will now be described in detail with continued reference to FIG. 2. As indicated above, the protector comprises two main protective members 14, 16.

The upper main member 14 includes a unitary and mainly circular upper cover 32. The upper cover 32 is preferably manufactured as a rotationally molded plastic unit. In the preferred embodiment, the upper cover is made of cross-link polyethylene, which has the advantageous characteristics of high lubricity and great abrasion resistance, as well as an impact strength much greater than that of fiberglass. Using this material, the upper cover provides great protection against dents, gouges and other damage, while still being easy and relatively inexpensive to produce. Other types of plastic, composite materials, fiberglass, etc. may also be used. As is seen in FIG. 2, the upper cover, when mounted on the wheel, is delimited outwardly by an upper limiting plane 34.

At the center of the upper cover is an annular central fastening portion 35, which surrounds a central hole. Extending radially outward from the central fastening portion is a concave wall portion 36. In FIG. 2, this concave portion is shown as having a mainly circular cross section. This shape is, however, not essential to the invention and may have a different curvature or may even be straight, so that the concave portion would be generally conical. Extending radially outward from the concave portion is an upper annular supporting portion 38, within which is located an annular recess 40. Extending radially outward from the supporting portion 38 is a curved annular flange portion 42, the curvature of which is chosen to correspond approximately to the typical curvature of the tire sidewall 29. As is shown in FIG. 2, when the protector is mounted on the wheel assembly, at least most of the flange portion will lie against the sidewall of the tire. An annular lip 44, convex with respect to the tire sidewall, is formed in the peripheral edge of the upper cover 32, radially outward from the flange 42.

An upper reinforcing member or plate 46, preferably of or plated with a corrosion-resistant metal, is securely mounted using fastening elements such as rivets or bolts 48 in the central fastening portion 35 of the upper cover. The characteristics of the upper reinforcing member will be explained in greater detail below.

The lower protective member 16 includes a unitary and mainly circular lower cover 50, which is preferably manufactured of the same material and using the same technique as the upper cover 32. As is seen in FIG. 2, the lower cover, when mounted on the wheel, is delimited by a lower limiting plane 52.

At the center of the lower cover is an annular central fastening portion 54, which surrounds a central hole. Extending radially outward from the central fastening portion is a concave wall portion 56. In FIG. 2, this concave portion is shown as having a mainly circular cross section. Although the concave portion 56 is shown in the figure as having a shape similar to that of the concave wall portion 36 of the upper cover, this is not necessary. This shape is, moreover, likewise not essential to the invention and may have a different curvature or may even be straight, so that the concave portion would be generally conical. The wall portion 56 may even exhibit an irregular shape, for example, if it is desired to provide extra support to mounted bearings. Normally, however, the concave wall portion will suffice to restrain and protect bearings. Note, however, that the concave portion of the lower cover extends radially farther than does the concave portion of the upper cover.

Extending radially outward from the concave portion 56 of the lower cover is an annular protrusion 58. Axially inward from the protrusion 58 is a lower annular supporting portion 60. Analogous to the flange 42 and lip 44 of the upper cover 32, axially inward of and extending radially outward from the supporting portion 60 of the lower cover is a curved annular flange portion 62, at the peripheral edge of which is an annular lip 64. The lips 44 and 64 are preferably located at a radial distance less than the maximum radius of the tire in order to allow the wheel assembly to be rolled if desired even when the protector is mounted.

A lower reinforcing member or plate 66, preferably of or plated with a corrosion-resistant metal, is securely mounted using fastening elements such as rivets or bolts 68 in the central fastening portion 54 of the lower cover. The characteristics of the lower reinforcing member will be explained in greater detail below.

A clamping member 70 is provided for clamping the upper and lower main protective members to either side of the wheel assembly. The clamping member includes a tubular shaft member 72 and an externally threaded rod 74. A threaded nut 76 or other internally threaded element is located at the lower end of the tubular shaft member 72, its threading meshing with that of the threaded rod 74. Grasping means 78 such as a T-handle, is attached preferably by welding to the upper end of the tubular shaft member 72.

FIG. 2 also shows the efficient covering and sealing characteristics of the present protector. Note that protection also extend to the tire sidewalls, as well as to all metal parts of the wheel. Because of the unitary covers, dust, rain and other particles are sealed out of the wheel. If the wheel assembly is fitted with an outwardly extending heat shield, which may extend outwardly in the area illustrated by (the broken line in FIG. 2,) it is accommodated and protected without requiring change to the covers since it may extend within the space created above the annular protrusion 58 and the concave wall 56.

As is shown in FIG. 3, a slot 80 is provided in the upper reinforcing plate 46 for receiving the tubular shaft member 72. In order to limit the insertion of the tubular shaft member into the upper reinforcing plate, a flange 82 is affixed to the shaft, for example by welding, below which a spacer element 84 seats in a recess 86 in the plate 46. A T-member 88 is affixed for example by welding to the lower end of the threaded rod 74. A slot 90 is provided in the lower reinforcing member 66 for receiving the T-member 88 and the lower portion of the threaded rod. A radial groove or indentation 92 is provided in the lower reinforcing member for receiving the T-member 88 when the protector is securely installed in a manner to be explained below.

It is to be noted that neither the upper reinforcing member 46 nor the lower reinforcing member 66 is essential to the invention; rather, the slots 80 and 90, as well as the groove 92, may be formed directly in the plastic covers 32 and 50, possibly using thickened portions, so that the main protective members comprise the covers alone. This solution would, however, be more prone to wear and would be less secure.

Figure 7:
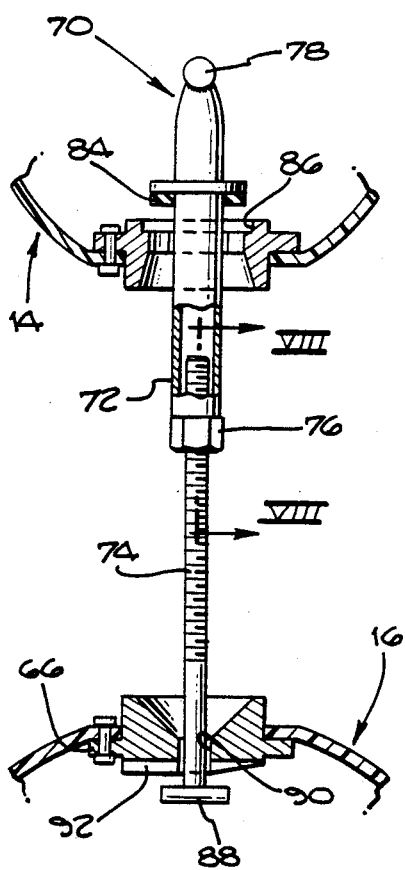
FIG. 7 is a partial cross-sectional view of the reinforcing members, and of a clamping member, as viewed along line VII—VII in FIG. 3.

In operation, an upper and a lower protective member is positioned on either side of and mainly concentric with a wheel assembly. In this position the slots 80 and 90 are aligned with the central bore 22 of the wheel. The clamping member 70 is assembled by screwing the threaded rod 74 partially into the tubular shaft member 72. The T-member 88 is extended through the slot 80, through the central wheel bore 22 and through the slot 90, so that it extends somewhat beyond the lower reinforcing member 66. FIG. 7 illustrates the position of the clamping member 70 relative to the main protective members 14 and 16 before tightening. It also shows the clamping member from the side relative to FIG. 3. The clamping member is then rotated approximately 90 degrees, whereby the T-member 88 aligns with the radial groove 92. By pulling on the handle 78, the T-member will seat in the radial groove. By simultaneously rotating the handle, and thus the tubular shaft member, the threaded rod will screw itself into the tubular shaft member until the main protective members are firmly clamped to the wheel.

Figure 9:
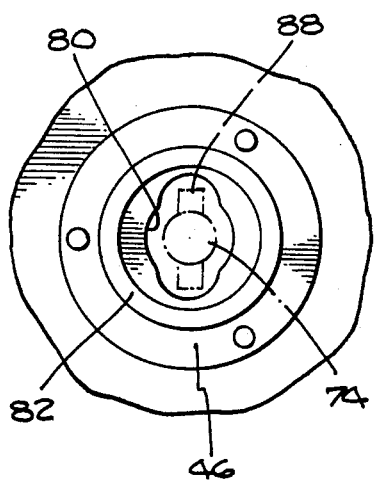
FIG. 9 illustrates the relative positions of the upper reinforcing member and of the clamping member during installation of the present protector.

FIG. 5 is a section taken along line V—V in FIG. 3. In particular, the figure illustrates by means of the broken line the preferred general shape of the slot 80 in the upper reinforcing member 46. The slot 80 exhibits a minimum diameter, which is equal to or, preferably slightly greater than the outer diameter of the tubular shaft member 72 in order further to prevent wiggling, as well as a maximum diameter. FIG. 9 illustrates the approximate relative dimensions of the slot 80 and of the threaded rod 74 and T-member 88. It will be seen that the maximum diameter of the slot 80 is greater than the length of the T-member so that it may easily be inserted through the slot when mounting the protector.

Figure 6:
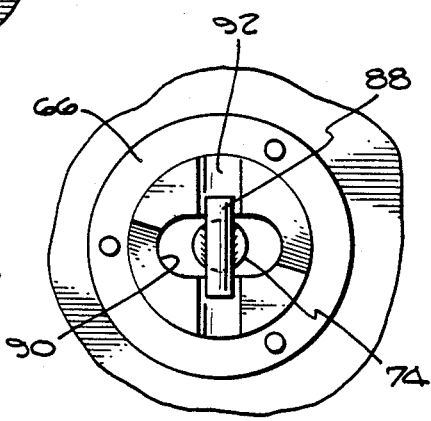
FIG. 6 is a view of a lower reinforcing member, and of a T-member in a locked position, viewed generally along line VI13 VI in FIG. 3.

FIG. 6 is a section taken along line VI—VI in FIG. 3. In particular, the figure illustrates the preferred general shape of the slot 90 in the lower reinforcing member 66. The slot 90 exhibits a minimum width, which is less than the length of the T-member 88 and equal to or preferably slightly greater than the diameter of the threaded rod 74. It also exhibits a maximum width which is greater than the length of the T-member 88. FIG. 6 also shows that the groove or indentation 92 is aligned approximately perpendicular to the direction of greatest extension of the slot 90.

Figure 10:
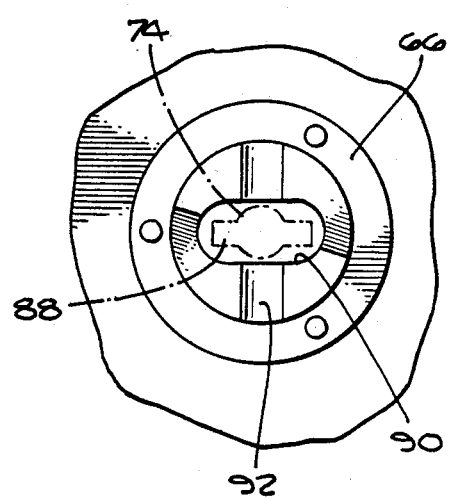
FIG. 10 illustrates the relative positions of the lower reinforcing member and of the clamping member during installation of the present protector.

FIG. 10 illustrates the approximate relative dimensions of the slot 90 and, by means of broken lines, of the threaded rod 74 and T-member 88. It will be seen that the T-member may easily be inserted through the slot 90 when aligned with it, yet cannot pass through the slot when it rests in the groove 92 as is shown in FIG. 6.

Figure 8:
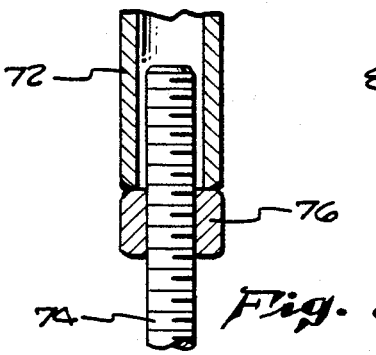
FIG. 8 is a cross section taken generally along line VIII—VIII in FIG. 7.

Because the threaded rod 74 can be screwed into the tubular shaft 72 to different depths, the total length of the clamping member is adjustable to the width of a given wheel assembly. It is therefore not necessary to manufacture clamping members of different lengths for aircraft wheels of different thicknesses. It is furthermore not necessary to provide the clamping member with a separate tightening element such as a wing nut. Such a clamping member could, however, also be used with the covers according to the present invention. The region in which &:he threaded rod 74 enters the tubular shaft member 72 by way of the threaded nut 76 is illustrated in greater detail in FIG. 8. Observe that the inner diameter of the tubular shaft member preferably is greater than the outer diameter of the threaded rod. It is not necessary for the tubular shaft member to be internally threaded.

Figure 4:
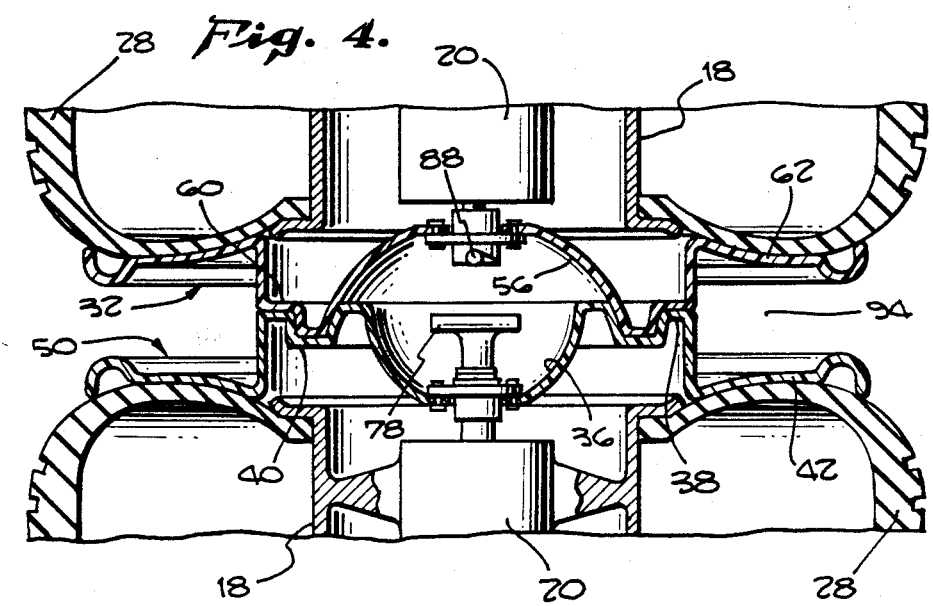
FIG. 4 illustrates by means of a partial cross sectional view the manner in which separate wheel assemblies, each provided with the present protector, are stacked horizontally.

FIG. 4 illustrates the manner in which the present invention enables stacking of wheel assemblies. The figure shows approximately the lower half of an upper wheel assembly and the upper half of an underlying wheel assembly. For the sake of clarity and simplicity, the reference numerals used in FIGS. 2 and 3 are retained in FIG. 4, although the lower protective member shown in FIG. is associated with a different: wheel assembly than the upper protective member shown. FIG. 4 illustrates three particularly advantageous features of the present invention.

First, the annular protrusion 58 of the lower cover 32 on the upper wheel assembly rests in the annular recess 40 in the upper cover 50 of the lower wheel assembly. Because the diameter of the recess is preferably at least approximately equal the diameter of the rim 18, the upper wheel rests firmly and securely on the underlying wheel, with little tendency to tipping. Distribution of the weight of the upper wheel is further improved by the contact of the supporting portions 38 and 60, and by distribution of weight to the tire sidewalls via the flanges 42 and 62. Note that no part of the upper wheel assembly comes in contact with any part of the lower wheel assembly, so that there is no risk of contact damage when the wheels are stacked. Because of this stability and efficient load distribution, wheels provided with the present protector may typically be stacked several high.

Second, FIG. 2 shows that when the covers are clamped to the wheels, the upper and lower ends of each clamping member, that is, the handle 78 and the T-member 88, terminate within the regions bounded by the upper and lower concave walls 36 and 56, respectively, and the limiting planes of the respective covers. In other words, a wheel assembly fitted with the present protector may be laid on a flat surface with either side up without the clamping member ever contacting the surface and risking damage. Of course, since the protector covers and protects the wheel itself, neither will any part of the wheel contact the flat surface.

Third, because the covers extend axially farther outward than the tires, when the wheels are stacked, there will be an interspace 94 between the flange portions of each opposing pair of upper and lower covers. The interspace will also be present between the cover flange portion and a flat surface such as a floor on which an undermost wheel assembly rests. In this latter case, the wheel assembly will rest securely and safely on either the annular protrusion 50 or the supporting portion 38. The interspace makes it possible to lift and move one or several wheel assemblies using a forklift: A fork is inserted in the interspace on either side of the rim of the bottommost wheel assembly, whereby the flange portion and annular lip of the bottommost cover both bear the load of the wheel assemblies and protect the tire of the bottommost assembly from the forklift forks:. Note that this arrangement allows the uppermost wheel assembly to be removed easily from a stack.

Whereas prior art arrangements often required two men to move a single wheel assembly, the present invention enables a single forklift operator to move and load several wheel assemblies at a time in complete safety to himself, without risk of damage to the wheels.

In one practical embodiment of the present invention, the covers were made of ⅜" thick rotationally molded cross-link polyethylene. The protector was therefore not only strong, but also lightweight and compact. The use of rotational molding further simplified manufacture. The diameter of the covers ranged from 32–40"; the diameter may, however, of course be varied so that the cover diameter corresponds to the diameter of a given aircraft wheel assembly. The diameter of the metal reinforcing members was less than 3".

What is claimed is:

1. For aircraft wheel assemblies each including a tire mounted on a hub, a protector comprising:
- an annular lower main protective member including
  an annular lower cover having a lower central fastening portion and a protruding portion,
  a lower mainly concave wall portion for enclosing bearings and protruding wheel members,
  a lower flange portion extending in a radial direction over a lower tire sidewall for enclosing and sealing the hub, for at least partially covering the lower tire sidewall, and for comprising a lower horizontal lifting and stacking surface; and
  a centrally secured lower reinforcing member;

- an annular upper main protective member including
  an annular upper cover having an upper central fastening portion and a receiving recess portion for receiving the protruding portion of the lower cover of an adjacent, horizontally stacked wheel assembly;
  an upper mainly concave wall portion,
  an upper flange portion extending in a radial direction over an upper tire sidewall for enclosing and sealing the hub, for at least partially covering the upper tire sidewall, and for comprising an upper horizontal lifting and stacking surface; and
  a centrally secured upper reinforcing member;
- the receiving recess portion and the protruding portion being located at a greater axial distance than the upper and lower flange portions, respectively, for providing an interspace between adjacent horizontally stacked wheel assemblies; and
- clamping means for clamping the protective members to either side of each wheel assembly, the clamping means extending through the upper reinforcing member, through a central bore in the hub, and through the lower reinforcing member, and comprising an externally threaded shaft member, and a tubular shaft member including grasping means and provided for adjustably receiving an upper end of the threaded shaft member, the threaded shaft member being provided with a locking T-member for securely seating in a groove in the lower reinforcing member.

2. For aircraft wheel assemblies each including a tire mounted on a hub, a protector comprising:
  an annular upper main protective member including an upper cover; and
  an annular lower main protective member including a lower cover;
  each main protective member extending in a radial direction over a respective tire sidewall for enclosing and sealing the hub, and for at least partially covering the tire sidewalls; and
  said upper and lower protective members including interfitting central portions for firmly mounting successive wheel assemblies on top of one another, and with sufficient space between (1) the sidewalls of adjacent tires, and (2) the tire sidewall of the lowermost wheel assembly and the underlying supporting surface such as a floor, to permit access for the fork of a forklift;
  whereby said wheel assemblies may be stored horizontally in a stack, and any desired number of said wheel assemblies may be lifted off the stack with a forklift, without damaging the tire sidewalls.

3. A protector as defined in claim 2, wherein
  the upper cover includes an upper central fastening portion, an upper mainly concave wall portion, and a flange portion;
  the lower cover includes a lower central fastening portion, a lower mainly concave wall portion, and a flange portion; and wherein
  the flange portions extend over respective tire sidewalls and comprise horizontal lifting surfaces.

4. A protector as defined in claim 3 including clamping means for clamping the protective members to either side of each wheel assembly.

5. A protector as defined in claim 3, wherein the upper and lower covers are rotationally molded of a highly abrasion-resistant material with high impact strength.

6. A protector as defined in claim 5, wherein the upper and lower covers comprise cross-link polyethylene.

7. A protector as defined in claim 3 for wheel assemblies including mounted bearings, wherein the lower mainly concave wall portion is provided for enclosing and restraining the bearings.

8. A protector as defined in claim 3 for wheel assemblies including a protruding heat shield, wherein the lower mainly concave wall portion is provided for enclosing the heat shield.

9. A protector as defined in claim 3, wherein
- the protector includes clamping means for securing the protector to the corresponding wheel assembly;
- the upper protective member includes a centrally secured upper reinforcing member;
- the lower protective member includes a centrally secured lower reinforcing member; and
  the clamping means, extends through the upper reinforcing member, a central bore in the hub, and through the lower reinforcing member, and comprises an externally threaded shaft member, and a tubular shaft member including grasping means and provided for adjustably receiving an upper end of the threaded shaft member, and wherein
- the threaded shaft member is provided with a locking T-member for securely seating in a groove in the lower reinforcing member.

10. For wheel assemblies each including a tire mounted on a hub, a protector comprising:
  an annular upper main protective member including an upper cover;
  an annular lower main protective member including a lower cover, each main member extending in a radial direction over a respective tire sidewall for enclosing and sealing the hub, for at least partially covering the tire sidewalls, and for providing supporting and stacking surfaces; and
  said upper and lower protective members including interfitting central portions for firmly mounting successive wheel assemblies on top of one another, and with sufficient space between (1) the sidewalls of adjacent tires, and (2) the tire sidewall of the lowermost wheel assembly and the underlying supporting surface such as a floor, to permit access for the fork of a forklift;
  whereby said wheel assemblies may be stored horizontally in a stack, and any desired number of said wheel assemblies may be lifted off the stack with a forklift, without damaging the tire sidewalls.

11. A protector as defined in claim 10, wherein the receiving recess and the protruding portion are annular.

12. A protector as defined in claim 11, wherein the receiving recess portion and the protruding portion are located at a greater axial distance than the upper and lower flange portions, respectively, for providing an interspace between adjacent horizontally stacked wheel assemblies.

13. A protector as defined in claim 12, wherein
- the protector includes clamping means for securing the protector to the corresponding wheel assembly;
- the upper protective member includes a centrally secured upper reinforcing member;
- the lower protective member includes a centrally secured lower reinforcing member: and

- the clamping means extends through the upper reinforcing member, through a central bore in the hub, and through the lower reinforcing member, and comprises an externally threaded shaft member, and a tubular shaft member including grasping means and provided for adjustably receiving an upper end of the threaded shaft member, and wherein
- the threaded shaft member is provided with a locking T-member for securely seating in a groove in the lower reinforcing member.

14. For aircraft wheel assemblies each including a tire mounted on a hub, a protector comprising:
   an annular upper main protective member including an upper cover;
   an annular lower main protective member including a lower cover;
   each main protective member extending in a radial direction over a respective tire sidewall for enclosing and sealing the hub, and for at least partially covering the tire sidewalls;
   the upper cover including an upper central fastening portion, an upper mainly concave wall portion, and a flange portion;
   the lower cover including a lower central fastening portion, a lower mainly concave wall portion, and a flange portion; and wherein
   the flange portions extending over respective tire sidewalls an comprise horizontal lifting surfaces;
   clamping means for clamping the protective members to either side of each wheel assembly;
   the upper protective member including a centrally secured upper reinforcing member;
   the lower protective member including a centrally secured lower reinforcing member; and
   the clamping means extending through the upper reinforcing member, through a central bore in the hub, and through the lower reinforcing member, and comprises an externally threaded shaft member, and a tubular shaft member including grasping means and provided for adjustably receiving an upper end of the threaded shaft member, and wherein
   the threaded shaft member is provided with a locking T-member for securely seating in a groove in the lower reinforcing member.

15. For aircraft wheel assemblies each including a tire mounted on a hub, a protector comprising:
   an annular upper main protective member including an upper cover;
   an annular lower main protective member including a lower cover;
   each main protective member extending in a radial direction over a respective tire sidewall for enclosing and sealing the hub, and for at least partially covering the tire sidewalls;
   the upper cover including an upper central fastening portion, an upper mainly concave wall portion, and a flange portion;
   the lower cover including a lower central fastening portion, a lower mainly concave wall portion, and a flange portion; and wherein
   the flange portions extend over respective tire sidewalls and comprise horizontal lifting surfaces;
   the upper and lower covers being rotationally molded of a highly abrasion-resistant material with high impact strength; and
   the diameter of the lower and upper covers lying in the range 32–40".

16. For wheel assemblies each including a tire mounted on a hub, a protector comprising:
   - an annular upper main protective member including an upper cover;
   - an annular lower main protective member including a lower cover, each main member extending in a radial direction over a respective tire sidewall for enclosing and sealing the hub, for at least partially covering the tire sidewalls, and for providing supporting and stacking surfaces; the lower cover including
   - a lower central fastening portion,
   - a lower mainly concave wall portion,
   - a protruding portion, and
   - a flange portion; the upper cover including
   - an upper central fastening portion,
   - an upper mainly concave wall portion,
   - a receiving recess portion for receiving the protruding portion of the lower cover of an adjacent, horizontally stacked wheel assembly, and
   - a flange portion; and wherein the flange portions extend over respective tire sidewalls and comprise horizontal lifting surfaces.

* * * * *